(12) United States Patent
Shindou et al.

(10) Patent No.: US 10,393,888 B2
(45) Date of Patent: Aug. 27, 2019

(54) LAMINATED SCINTILLATOR PANEL

(71) Applicant: Konica Minolta, Inc., Chiyoda-ku, Tokyo (JP)

(72) Inventors: Hiromichi Shindou, Hachioji (JP); Tadashi Arimoto, Hino (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/628,781

(22) Filed: Jun. 21, 2017

(65) Prior Publication Data
US 2017/0371045 A1    Dec. 28, 2017

(30) Foreign Application Priority Data

Jun. 22, 2016  (JP) ................................. 2016-123364

(51) Int. Cl.
    *G01T 1/20*   (2006.01)
(52) U.S. Cl.
    CPC ............ *G01T 1/2012* (2013.01); *G01T 1/20* (2013.01)
(58) Field of Classification Search
    CPC ......... G01T 1/11; G01T 1/115; C09K 11/616; C09K 11/00; F21K 2/04
    See application file for complete search history.

(56) References Cited

U.S. PATENT DOCUMENTS

| | | | | |
|---|---|---|---|---|
| 6,479,824 | B1* | 11/2002 | Hoffman | G01T 1/2002 250/367 |
| 6,749,761 | B1* | 6/2004 | Andreaco | G01T 1/2002 216/24 |
| 2010/0006769 | A1* | 1/2010 | Kraft | G01T 1/167 250/370.11 |
| 2013/0126753 | A1* | 5/2013 | Aylward | B32B 37/1284 250/458.1 |
| 2017/0146671 | A1* | 5/2017 | Shigeta | G01T 1/20 |

FOREIGN PATENT DOCUMENTS

| | | |
|---|---|---|
| JP | 2004-061492 A | 2/2004 |
| JP | 2005-201891 A | 7/2005 |
| JP | 2007-203062 A | 8/2007 |

OTHER PUBLICATIONS

Rutishauser et al.; "Structured scintillator for hard x-ray grating interferometry"; Applied Physics Letters; 98-171107; 2011; 3 pages.
Derenzo et al.; "Scintillation Properties"; http://scintillator.lbl.gov/; May 2017; accessed Jul. 28, 2017; 32 pages.

* cited by examiner

*Primary Examiner* — David P Porta
*Assistant Examiner* — Mamadou Faye
(74) *Attorney, Agent, or Firm* — Baker Hostetler (57) ABSTRACT

Provided is a method of manufacturing a laminated scintillator panel having a structure in which a scintillator layer and a non-scintillator layer are repeatedly laminated in a parallel direction perpendicular to incidence of radiation, characterized by including a step of joining the scintillator layer and the non-scintillator layer. The present invention provides a method of manufacturing a lattice-shaped laminated scintillator panel capable of enlarging the area and increasing the thickness with means completely different from a prior art in which a silicon wafer is used.

9 Claims, 2 Drawing Sheets

LAMINATED SCINTILLATOR PANEL

This application claims priority under 35 U.S.C. § 119 to Japanese Patent Application No. 2016-123364 filed on Jun. 22, 2016, the entirety of which is hereby incorporated by reference.

TECHNOLOGICAL FIELD

The present invention relates to a novel laminated scintillator panel expected to be used in a next-generation Talbot system.

DESCRIPTION OF THE RELATED ART

Currently, in X-ray image diagnosis, an absorption image that images attenuation of an X-ray after passing through an object is used. On the other hand, since X-rays are a type of electromagnetic waves, attention is paid to this wave nature, and attempts to image changes in the phase after X-rays have passed through an object have been made in recent years. These are called an absorption contrast and a phase contrast, respectively. The imaging technique using such a phase contrast is considered to have a high sensitivity to soft tissues of a human body containing a lot of these because the sensitivity to light elements is higher than a conventional absorption contrast.

However, since a conventional phase contrast imaging technique needs the use of a synchrotron X-ray source or a minute focus X-ray tube, it has thought to be difficult for them to be in practical use in general medical facilities because the former needs to have a huge facility and the latter cannot secure sufficient X-ray dose to photograph a human body.

In order to solve this problem, X-ray image diagnosis (Talbot system) using an X-ray Talbot-Lau interferometer capable of acquiring a phase contrast image using an X-ray source conventionally used in a medical field is expected.

Figure 3:
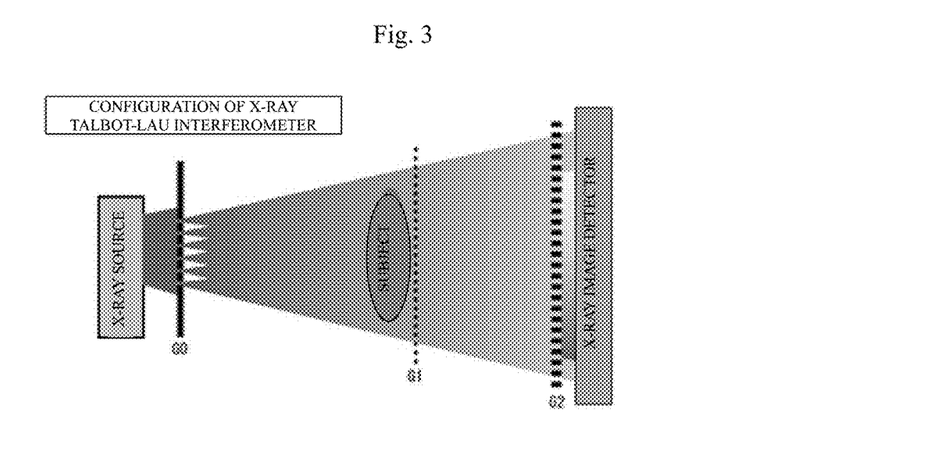
FIG. 3 is a schematic configuration diagram of a Talbot scintillator.

As shown in FIG. 3, a Talbot-Lau interferometer has a G0 lattice, a G1 lattice, and a G2 lattice each disposed between a medical X-ray tube and an FPD, and visualizes refraction of X-rays by a subject as moire fringes.

X-rays are irradiated in a longitudinal direction from an X-ray source disposed in an upper portion and reach an image detector through G0, subject, G1, and G2.

As a manufacturing method of a lattice, for example, a method is known in which a silicon wafer having high X-ray transmissivity is etched to provide lattice-shaped recesses and heavy metals having high X-ray shielding properties are filled therein.

However, with the above method, it is difficult to increase the area due to available silicon wafer size, etching apparatus limitation, or the like, and an object to be photographed is limited to a small part. It is not easy to form a deep recess in a silicon wafer by etching, and it is also difficult to evenly fill metal to the depth of the recess, and therefore, it is difficult to fabricate a lattice having a thickness enough to sufficiently shield X-rays. For this reason, particularly under high-voltage photographing conditions, X-rays transmit the lattice, making it incapable of obtaining a favorable image.

On the other hand, it is also studied to adopt a lattice-shaped scintillator having a lattice function added to a scintillator constituting an image detector. For example, "Structured scintillator for x-ray grating interferometry" (Paul Scherrer Institute (PSI)) of Applied Physics Letters 98, 171107 (2011) discloses a lattice-shaped scintillator in which a groove of a lattice fabricated by etching a silicon wafer is filled with a phosphor (CsI).

However, since, in the above method, a silicon wafer is used as in the above-described method of fabricating a G2 lattice, a situation where the area is restricted or a situation where it is difficult to increase the thickness, which is a problem caused by the silicon wafer, has not been improved. Further, as CsI repeats collisions on a wall surface of a silicon lattice, the emission thereof is attenuated, which causes a new problem of lowering the luminance.

U.S. Pat. No. 5,127,246 (Patent Document 1) discloses a focus-detector system of an X-ray apparatus for producing phase contrast images by projection and tomography. Patent Document 1 discloses that a photon transmits downward in a groove of a G2 lattice, and that such a groove is filled with a scintillation material. Although the period of the G1 lattice and the period of the G2 lattice are defined in Patent Document 1, basically, it is presumed that the G2 lattice is on the repetitive arrangement of a void (groove) and a lattice.

Japanese Unexamined Patent Application Publication No. 2004-61492 (Patent Document 2) discloses filling a reflective layer in lattice-shaped notch grooves formed in a scintillator, or filling a reflective layer after inserting a three-layered separator of white diffusing reflecting layer/metallic film/white diffusing reflecting layer.

Japanese Unexamined Patent Application Publication No. 2005-201891 (Patent Document 3) discloses provision of a reflecting layer between partitioned scintillators.

In these Cited Documents, repetition of reflecting layer/scintillator layer is presumed.

On the other hand, the present inventors devised a slit-like scintillator, which is different from a conventional concept, in which lamination units composed of a scintillator layer and a non-scintillator layer are repeatedly laminated.

In the slit-like scintillator, there is a problem that when a non-scintillator layer is not made transparent, MTF is favorable since light diffusion can be suppressed, but light absorption occurs (even at the time of reflection, especially in the case of a metal reflecting layer, some absorption occurs), resulting in too low brightness, and there is also a problem that when a non-scintillator layer is transparent, the luminance is favorable, but the MTF decreases due to light diffusion to an adjacent slit.

Therefore, an optically functional layer such as a reflecting layer, a light transmitting layer, a light absorbing layer, and the like need to be provided. However, it is completely unknown how to arrange such an optical functional layer in the slit-like scintillator.

Patent Documents 1 to 3 disclose a scintillator in which sections are divided by etching or cutting rather than a slit-like scintillator, and therefore do not suggest any arrangement of an optically functional layer at all.

SUMMARY

To achieve at least one of the abovementioned objects, an image forming apparatus reflecting one aspect of the present invention comprises A laminated scintillator panel having a structure in which structural units containing at least one scintillator layer having a function of emitting light when receiving X-rays and a non-scintillator layer are repeatedly laminated in a parallel direction perpendicular to incidence of radiation, wherein at least one functional layer having optical characteristics different from those of the scintillator layer and the non-scintillator layer is contained in the array structure.

BRIEF DESCRIPTION OF THE DRAWINGS

The advantages and feature provided by one or more embodiments of the invention will become more fully understood from the detailed description given hereinbelow and the appended drawings which are given by way of illustration only and thus are not intended as a definition of the limit of the present invention.

DETAILED DESCRIPTION OF EMBODIMENTS

Hereinafter, one or more embodiments of the present invention will be described with reference to the drawings. However the scope of the invention is not limited to the disclosed embodiments.

The laminated scintillator panel of the present invention will be described.

Figure 1:
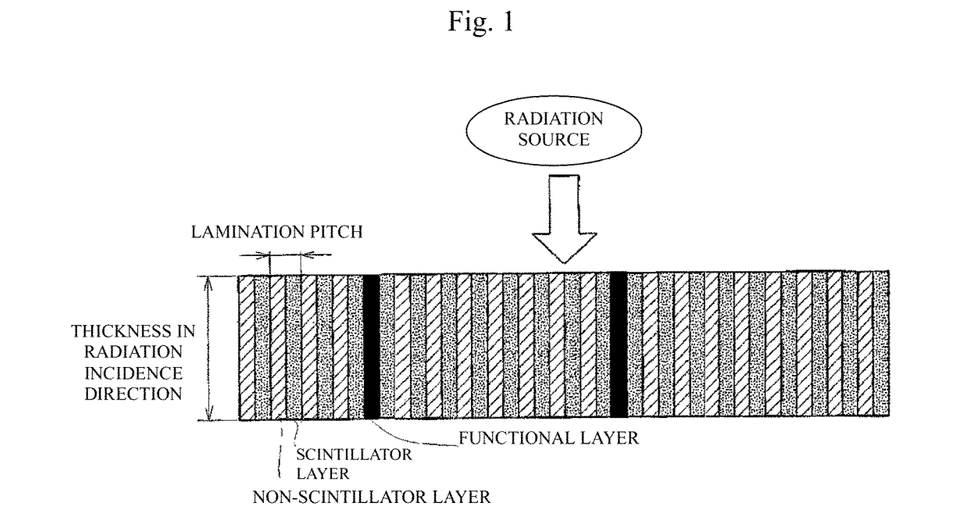
FIG. 1 is a schematic diagram of one aspect of a laminated scintillator panel.

As shown in FIG. 1, a laminated scintillator panel has a structure in which a scintillator layer having a function of emitting light when receiving X-rays and a non-scintillator layer are repeatedly laminated in a parallel direction perpendicular to incidence of radiation.

By facing the radiation incidence surface or the opposite surface of the laminated scintillator panel to a photoelectric conversion panel, the emission of the scintillator by radiation can be converted into an electric signal to acquire a digital image.

Parallel means almost parallel, and complete parallel and slight inclination are included in a category of "substantially parallel".

The thickness (hereinafter referred to as lamination pitch) of a pair of a scintillator layer and a non-scintillator layer in the lamination direction and the ratio (hereinafter duty ratio) of the thickness of the scintillator layer to the thickness of the non-scintillator layer in the lamination direction are derived from Talbot interference conditions, and in general, the lamination pitch is from 05 to 50 μm and the duty ratio is preferably from 3070 to 7030. In order to obtain a diagnostic image with a sufficient area, it is preferable that the number of repeated lamination layers of the lamination pitch is from 1,000 to 500,000.

The thickness of the laminated scintillator panel of the present invention in the radiation incidence direction is preferably from 10 to 1,000 μm, and more preferably from 100 to 500 μm. When the thickness in the radiation incidence direction is smaller than the lower limit value of the above range, the light emission intensity of the scintillator is weakened, and the image quality is deteriorated. When the thickness in the radiation incidence direction is larger than the upper limit of the above range, the distance of light emitted from the scintillator to a photoelectric conversion panel becomes long, and therefore, light easily diffuses and the sharpness deteriorates.

The scintillator layer in the present invention is a layer containing a scintillator as a main component, and preferably contains scintillator particles.

As the scintillator according to the present invention, substances capable of converting radiation such as X rays into radiation having different wavelengths such as visible light can be appropriately used. Specifically, scintillators and phosphors described in "Phosphor Handbook" (edited by Phosphor Research Society, Ohmsha Ltd., 1987) ranging from page 284 to page 299, substances listed in the web site "Scintillation Properties (http://scintillator.lbl.gov/)" of the US Lawrence Berkeley National Laboratory, or the like may be used, and substances not mentioned here can also be used as scintillators as long as they are "substances capable of converting radiation such as X-rays into radiation having different wavelengths such as visible light".

Specific examples of the composition of the scintillator include the following examples.

First, a metal halide phosphor represented by $$MIX \cdot aMIIX'2 \cdot bMIIIX''3:zA \qquad \text{Basic composition formula (I)}$$

can be mentioned.

In the basic composition formula (I), MI represents at least one element selected from the group consisting of elements capable of becoming monovalent cations, that is, Li, Na, K, Rb, Cs, Tl, Ag, and the like.

MII represents at least one element selected from the group consisting of elements capable of becoming divalent cations, that is, Be, Mg, Ca, Sr, Ba, Ni, Cu, Zn, Cd, and the like.

MIII represents at least one element selected from the group consisting of elements belonging to Sc, Y, Al, Ga, In, and lanthanoid. X, X', and X" each represent a halogen element, and may be different or the same.

A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi. a, b, and z each independently represent a numerical value within the range of $0 \leq a < 05$, $0 \leq b < 05$, $0 < z < 1.0$.

Rare earth activated metal fluorohalide phosphors represented by $$MIIFX:zLn \qquad \text{Basic composition formula (II)}$$

can also be mentioned.

In the basic composition formula (II), MII represents at least one alkaline earth metal element, Ln represents at least one element belonging to the lanthanoid, and X represents at least one halogen element. z is $0 < z \leq 02$.

Rare earth oxysulfide phosphors represented by $$Ln2O2S:zA \qquad \text{Basic composition formula (III)}$$

can also be mentioned.

In the basic composition formula (III), Ln represents at least one element belonging to the lanthanoid, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi. z satisfies $0 < z < 1$.

In particular, Gd2O2S using Gd as Ln is preferable since it is known to exhibit high emission characteristics in a wavelength region where the sensor panel is most likely to receive light by using Tb, Dy or the like as the element type of A.

Metal sulfide-based phosphors represented by $$MIIS:zA \qquad \text{Basic composition formula (IV)}$$

can also be mentioned.

In the basic composition formula (IV), MII represents at least one element selected from the group consisting of elements capable of becoming divalent cations, that is, alkaline earth metals, Zn, Sr, Ga, and the like, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi. z satisfies 0<z<1.

Metal oxoacid salt-based phosphors represented by $$\text{MII}a(\text{AG})b{:}z\text{A} \qquad \text{Basic composition formula (V)}$$

can also be mentioned.

In the basic composition formula (V), MII represents a metal element which can be a cation, (AG) represents at least one oxo acid group selected from the group consisting of phosphate, borate, silicate, sulfate, tungstate and aluminate, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi.

a and b represent all possible values depending on the valence of the metal and oxo acid groups. z satisfies 0<z<1.

A metal oxide-based phosphor represented by $$\text{M}a\text{O}b{:}z\text{A} \qquad \text{Basic composition formula (VI)}$$

can also be mentioned.

In the basic composition formula (VI), M represents at least one element selected from metal elements which can become cations.

A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi.

a and b represent all possible values depending on the valence of the metal and oxo acid groups. z satisfies 0<z<1.

Besides, a metal acid halide-based phosphor represented by $$\text{LnOX}{:}z\text{A} \qquad \text{Basic composition formula (VII)}$$

can also be mentioned.

In the basic composition formula (VII), Ln represents at least one element belonging to the lanthanoid, X represents at least one halogen element, and A represents at least one element selected from the group consisting of Y, Ce, Pr, Nd, Sm, Eu, Gd, Tb, Dy, Ho, Er, Tm, Yb, Lu, Na, Mg, Cu, Ag, Tl, and Bi. z satisfies 0<z<1.

The average particle size of the scintillator particles is selected according to the thickness of a scintillator layer in the lamination direction, and is preferably 100% or less, more preferably 90% or less, with respect to the thickness in the lamination direction of the scintillator layer. When the average particle diameter of the scintillator particles exceeds the above range, disturbance of the lamination pitch becomes large and the Talbot interference function decreases.

The content of the scintillator particles in the scintillator layer is preferably 30 vol % or more, more preferably 50 vol % or more, still more preferably 70 vol % or more in consideration of luminescent properties.

The non-scintillator layer in the present invention is a layer that transmits visible light and does not contain a scintillator as a main component, and the content of the scintillator in the non-scintillator layer is less than 10 vol %, preferably less than 1 vol %, and most preferably 0 vol %.

Preferably, the non-scintillator layer contains a variety of glasses, polymer materials, metals, and the like as main components. These may be used singly or in combination of a plurality of them.

Specifically, plate glass such as quartz, borosilicate glass, or chemically tempered glass; ceramics such as sapphire, silicon nitride, or silicon carbide;

semiconductor such as silicon, germanium, gallium arsenide, gallium phosphorus, or gallium nitrogen;

polymers such as: polyester such as polyethylene terephthalate (PET) or polyethylene naphthalate (PEN); aliphatic polyamide such as nylon; aromatic polyamide (aramid); polyimide; polyamide imide; polyether imide; polyethylene; polypropylene; polycarbonate; triacetate; cellulose acetate; epoxy; bismaleimide; polylactic acid; sulfur-containing polymers such as polyphenylene sulfide or polyether sulfone; polyether ether ketone; fluororesin; acrylic resin; or polyurethane;

carbon fibers, glass fibers or the like (in particular, fiber reinforced resin sheets including such fibers);

metal foil such as aluminum, iron, copper; bionanofibers including chitosan, cellulose, or the like can be used.

For the non-scintillator layer, a polymer film is preferable from a viewpoint of handling during production. Although, when the non-scintillator layer is not transparent, MTF is favorable and light diffusion can be suppressed, light absorption occurs (even at the time of reflection, especially in the case of a metal reflecting layer, some absorption occurs) and luminance becomes low. On the other hand, when the non-scintillator layer is transparent, the luminance is favorable, but the MTF is insufficient due to light diffusion to an adjacent slit.

Therefore, the laminated scintillator panel of the present invention is characterized in that at least one functional layer having optical properties different from those of a scintillator layer and a non-scintillator layer is provided in the array structure of the laminated scintillator panel having a structure repeatedly laminated in a parallel direction perpendicular to incidence of radiation, instead of merely making the non-scintillator layer light transmissive.

As shown in FIG. 1, a functional layer is provided between scintillator layers. It is note that the functional layer does not constitute a partial laminate in place of a non-scintillator layer, is provided at a predetermined pitch according to a purpose, and may be composed of one layer or two or more layers.

The functional layer is not particularly limited as long as it has optical characteristics different from those of the scintillator layer and the non-scintillator layer, and a plurality of functional layers having different functions may be provided.

Examples of the functional layer include a diffusion prevention layer in which light hardly passes, a reflecting layer with large reflection of light, and a light absorbing layer for absorbing light.

In the present invention, it is preferable that two or more such functional layers are provided in the laminated scintillator, and the distance between the functional layers is not more than three times the distance between the radiation incident surface and the radiation exit surface of the laminated scintillator panel. By providing the functional layer at such intervals, the MTF can be greatly improved without impairing the luminance of a slit scintillator. The plurality of functional layers provided may have the same function or may have different functions.

Figure 2:
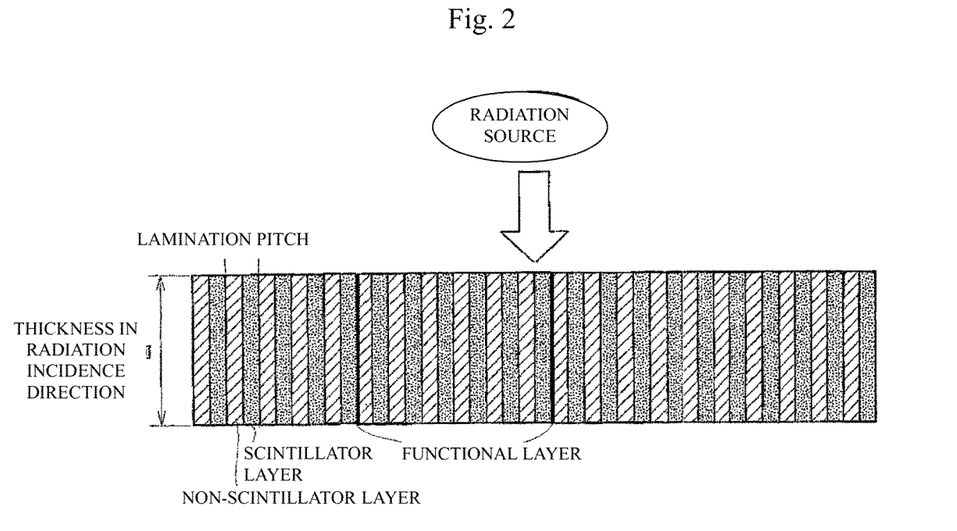
FIG. 2 is a schematic diagram of another aspect of a laminated scintillator panel.

As shown in FIG. 1, the functional layer is not only provided between the scintillator layers but may be provided on the surface (i.e., the interface between the scintillator layer and the non-scintillator layer) of the non-scintillator layer as shown in FIG. 2. The functional layer of such an aspect can be formed by, for example, processing the surface of the non-scintillator layer, and specifically, can be formed by forming a reflecting layer on the non-scintillator layer surface by metal sputtering or the like. Further, in the present invention, both aspects of FIGS. 1 and 2 may be included.

As the functional layer, the following preferable embodiments can be employed depending on the reflectance. In one embodiment of the functional layer, the reflectance of light having a wavelength at which the intensity of light emitted by the scintillator is maximum is 70% or more (such a functional layer is referred to as "functional layer A"), and the distance between the functional layers A in such a case is larger than ¼ of the distance between the radiation incident surface and the radiation exit surface of the laminated scintillator panel.

In one embodiment of the functional layer, the reflectance of light having a wavelength at which the intensity of light emitted by the scintillator is maximum is 40% or more and less than 70% (such a functional layer is referred to as "functional layer B"), the distance between the functional layers B in such a case is larger than ⅓ times the distance between the radiation incident surface and the radiation exit surface of the laminated scintillator panel.

In one embodiment of the functional layer, the reflectance of light having a wavelength at which the intensity of light emitted by the scintillator is maximum is less than 40% (such a functional layer is referred to as "functional layer C"), the distance between the functional layers C in such a case is larger than half the distance between the radiation incident surface and the radiation exit surface of the laminated scintillator panel.

In the above, "wavelength at which the intensity of light emitted by the scintillator is maximum" is appropriately selected according to a phosphor or the like constituting the scintillator.

In this way, by defining the distance between functional layers according to the light reflectance of the functional layer, a scintillator panel that can balance the luminance and MTF can be manufactured.

Such functional layers A to C are composed of a variety of materials so that the reflectance falls within the above range, and are composed of, for example, a resin obtained by mixing nanoparticles for adjusting the reflectance.

The nanoparticles to be used are particles having a particle diameter of roughly nano order, and inorganic particles or organic particles may be used without particular limitation.

Examples of the particles include metal salt particles such as inorganic oxides, inorganic nitrides, carbonates, sulfates, and chlorides. For example, white pigments such as $TiO_2$ (anatase-type, rutile-type), MgO, $PbCO_3.Pb(OH)_2$, $BaSO_4$, $Al_2O_3$, M(II)FX (Here, M (II) is at least one atom selected from Ba, Sr and Ca, and X is Cl atom or Br atom.), $CaCO_3$, ZnO, $Sb_2O_3$, $SiO_2$, $ZrO_2$, lithopone [$BaSO_4.ZnS$], magnesium silicate, basic silicate, basic lead phosphate, aluminum silicate and the like can be used. As the nanoparticles, glass beads, resin beads, hollow particles in which the hollow portion exists in the particles, multi-hollow particles in which many hollow portions exist in the particles, porous particles, and the like can be used. One of these substances may be used alone, or two or more of these substances may be used in combination.

The functional layer may be composed of a metal, and examples of the metal include Al, Ag, Cr, Cu, Ni, Ti, Mg, Rh, Pt, and Au. These metals may constitute a functional layer as a single substance, or particulate metals may be contained in the functional layer.

The functional layer may contain a pigment, and examples of the pigment include a black colorant that easily absorbs light. As such a black coloring agent, for example, carbon black, titanium black, or the like can be used. Titanium black is blackened by removing a part of oxygen from titanium dioxide.

The resin constituting the functional layer by mixing with the above-mentioned particles is not particularly limited as long as it functions as a binder and can achieve a predetermined reflectance, and specific examples thereof include easily adhesive polymers such as polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyrals, polyesters, cellulose derivatives (such as nitrocellulose), styrene-butadiene copolymers, a variety of synthetic rubber resins, phenol resins, epoxy resins, urea resins, melamine resins, phenoxy resins, silicone resins, acrylic resins, and urea formamide resins. Among these, polyurethane, polyester, silicone resins, acrylic resins and polyvinyl butyrals are preferable. These binders may be used singly or in combination of two or more.

The mixing ratio of the nanoparticles and a resin contained in the functional layer is not particularly limited as long as the reflectance falls within a predetermined range.

According to the present invention, in a slit scintillator, a period of placing a functional layer having an optical function (reflecting layer, light transmitting layer, light absorbing layer, or the like) is defined according to the magnitude of the reflectance. By this, a laminated scintillator panel excellent in luminance and MTF in a well-balanced manner can be obtained.

In still another aspect of the functional layer, the refractive index of the functional layer may be smaller than the refractive index of the main component of the scintillator layer, and may be totally reflected when light is incident on the functional layer from the scintillator layer. Such a functional layer may be composed of an inorganic material such as silica or $MgF_2$, and further, may be an air layer or a liquid layer (including gelled material). In particular, when the reflectance can not be defined in the case of air, liquid, or the like, a functional layer can be defined by the refractive index. The functional layer of this embodiment is preferably an air layer.

As in the prior art, in a method of filling a partition wall surface with a scintillator layer or sectioning by cutting the scintillator layer, it is difficult to place a functional layer at a desired period. With the laminated slit-type scintillator of the present invention, the arrangement of the functional layer can be freely controlled.

The laminated scintillator according to the present invention is manufactured by laminating a scintillator layer and a non-scintillator layer and joining the scintillator layer and the non-scintillator layer. Joining in the present invention means bonding the scintillator layer and the non-scintillator layer to integrate them. As a joining method, both of them can be adhered via an adhesive layer, and from a viewpoint of process simplification, it is preferable to preliminarily contain an adhesive resin in the scintillator layer or the non-scintillator layer, and bring them into close contact with each other by pressure, thereby joining them without interposing an adhesive layer. Heating in a pressurized state is more preferable because a substance having adhesiveness is melted or cured to strengthen adhesion. It is also possible to coat the surface of the non-scintillator layer with a composition capable of forming a scintillator layer, or to join the scintillator layer and the non-scintillator layer by further removing the solvent, as needed. When joining the scintillator layer and the non-scintillator layer, a laminated scintillator according to the present invention can be constituted by disposing a functional layer on a scintillator layer and bonding the scintillator layer with another scintillator layer.

When the functional layer is an air layer or a liquid layer, a spacer may be placed on the edge portion of the scintillator layer to provide a predetermined gap and be filled with air or a predetermined liquid.

An adhesive resin may be contained in either a scintillator layer or a non-scintillator layer, and particularly preferably, a scintillator layer contains an adhesive resin as a binder for scintillator particles. The adhesive resin is preferably a material that is transparent to the emission wavelength of the scintillator so as not to inhibit the propagation of light emitted from the scintillator.

The adhesive resin is not particularly limited as long as the object of the present invention is not impaired, and examples thereof include natural polymers such as proteins such as gelatin, polysaccharides such as dextran, or gum arabic; and synthetic polymeric substances such as polyvinyl butyral, polyvinyl acetate, nitrocellulose, ethylcellulose, vinylidene chloride vinyl chloride copolymer, poly(meth)acrylate, vinyl chloride vinyl acetate copolymer, polyurethane, cellulose acetate butyrate, polyvinyl alcohol, polyester, epoxy resin, polyolefin resin, and polyamide resin. These resins may be crosslinked with a crosslinking agent such as epoxy or isocyanate, and these adhesive resins may be used singly or in combination of two or more kinds. The adhesive resin may be either a thermoplastic resin or a thermosetting resin.

The content of an adhesive resin contained in the scintillator layer is preferably from 1 to 70 vol %, more preferably from 5 to 50 vol %, and still more preferably from 10 to 30 vol %. When the content is lower than the lower limit of the above range, sufficient adhesiveness can not be obtained, and conversely, when the content is higher than the upper limit of the above range, the content of the scintillator becomes insufficient and the amount of luminescence decreases.

The scintillator layer may be formed by coating a composition in which the scintillator particles and an adhesive resin are dissolved or dispersed in a solvent, or may be formed by coating a composition prepared by heating and melting a mixture containing the scintillator particles and an adhesive resin.

When coating the composition in which the scintillator particles and the adhesive resin are dissolved or dispersed in a solvent, examples of usable solvents include: lower alcohols such as methanol, ethanol, isopropanol, and n-butanol; ketones such as acetone, methyl ethyl ketone, methyl isobutyl ketone, and cyclohexanone; aromatic compounds such as toluene, benzene, cyclohexane, cyclohexanone, and xylene; esters of lower fatty acids and lower alcohols such as methyl acetate, ethyl acetate, and n-butyl acetate; ethers such as dioxane, ethylene glycol monoethyl ether, ethylene glycol monomethyl ether, methoxypropanol propylene glycol monomethyl ether, and propylene glycol monomethyl ether acetate; halogenated hydrocarbons such as benzenetriol, methylene chloride and ethylene chloride; and mixtures thereof. A variety of additives such as a dispersant for improving dispersibility of scintillator particles in the composition and a curing agent or a plasticizer for improving the bonding force between an adhesive resin and scintillator particles in a scintillator layer after formation may be mixed in the composition.

Examples of the dispersant used for such purpose include phthalic acid, stearic acid, caproic acid, and lipophilic surfactant.

Examples of the plasticizer include: phosphoric acid esters such as triphenyl phosphate, tricresyl phosphate, and diphenyl phosphate; phthalic acid esters such as diethyl phthalate and dimethoxyethyl phthalate; glycolic acid esters such as ethyl phthalyl ethyl glycolate and butyl phthalyl butyl glycolate; and polyesters of polyethylene glycol and aliphatic dibasic acids such as polyesters of triethylene glycol and adipic acid, and polyesters of diethylene glycol and succinic acid. As the curing agent, a known curing agent for a thermosetting resin can be used.

Alternatively, a functional layer prepared by coating on a transfer substrate and drying in advance may be transferred and provided on the scintillator layer. When a metal thin film is provided as a functional layer, a metal such as Ag, Al, Ni, or Cr may be formed by vapor deposition or sputtering. Alternatively, a metal thin film prepared in advance may be transferred.

When heating and melting the mixture containing the scintillator particles and the adhesive resin, it is preferable to use a hot-melt resin as the adhesive resin. As the hot-melt resin, for example, one mainly composed of a polyolefin-based, polyamide-based, polyester-based, polyurethane-based, or acrylic-based resin can be used. Among these, from viewpoints of light permeability, moisture resistance, and adhesiveness, those based on a polyolefin resin as a main component are preferable. As the polyolefin-based resin, for example, ethylene-vinyl acetate copolymer (EVA), ethylene-acrylic acid copolymer (EAA), an ethylene-acrylic acid ester copolymer (EMA), ethylene-methacrylic acid copolymer (EMAA), ethylene-methacrylic acid ester copolymer (EMMA), an ionomer resin or the like can be used. These resins may be used as a so-called polymer blend in which two or more kinds of resins are combined.

There are no particular restrictions on means for coating a composition for forming a scintillator layer, and usual coating means such as a doctor blade, a roll coater, a knife coater, an extrusion coater, a die coater, a gravure coater, a lip coater, a capillary coater, a bar coater, a dip coater, a spray coater, or a spin coater can be used.

In the present invention, there is a step of bonding the scintillator layer and the non-scintillator layer after repeatedly laminating the scintillator layer and the non-scintillator layer.

There are no particular restrictions on the method of repeatedly laminating the scintillator layer and the non-scintillator layer, and an individually formed scintillator layer and non-scintillator layer may be divided into a plurality of sheets, and then the sheets may be alternately repeatedly laminated.

In the present invention, it is preferable that a plurality of partial laminates in which the scintillator layer and the non-scintillator layer are bonded to each other are formed, and then the plurality of partial laminates are laminated to form the laminate since it is easy to adjust the number of layers and the thickness of the laminate.

For example, a partial laminate composed of a pair of scintillator layer and non-scintillator layer may be formed in advance, the partial laminate may be divided into a plurality of sheets, and the sheets may be laminated repeatedly. At this time, a desired functional layer may be provided separately and laminated so as to be arranged at an appropriate interval.

When the partial laminate composed of the scintillator layer and the non-scintillator layer has a film shape that can be wound up, efficient lamination is possible by winding the film on a core. The winding core may be cylindrical or a plate. More efficiently, the repeated laminate of the scintillator layer and the non-scintillator layer fabricated by the above method may be bonded (integrated) by pressurization, heating, or the like, and then divided into a plurality of sheets, and the sheets may be repeatedly laminated.

Further, when laminating the partial laminate, the functional layer may be provided so as to have a predetermined layer interval.

There is no particular restriction on the method of forming a partial laminate composed of a scintillator layer and a non-scintillator layer, and a scintillator layer may be formed by selecting a polymer film as a non-scintillator layer and coating a composition containing scintillator particles and an adhesive resin on one side thereof. A composition containing scintillator particles and an adhesive resin may be coated on both sides of a polymer film.

As described above, when a partial laminate is formed by coating a composition containing scintillator particles and an adhesive resin on a polymer film, it is possible to simplify a process and to easily divide the partial laminate into a plurality of sheets. The dividing method is not particularly limited, and a usual cutting method is selected.

A transfer substrate coated with a scintillator layer in advance may be transferred onto a film composed of a non-scintillator layer. As needed, the transfer substrate is removed by means such as peeling.

In the present invention, the scintillator layer and the non-scintillator layer are bonded by pressurizing the laminate so that the scintillator layer and the non-scintillator layer are in a substantially parallel direction perpendicular to incidence of radiation. A functional layer is provided at predetermined intervals.

By heating a repeated laminate of a plurality of scintillator layers and non-scintillator layers in a pressurized state so as to obtain a desired size, the lamination pitch can be adjusted to a desired value.

There is no particular restriction on the method of pressurizing the repeated laminate of the plurality of scintillator layers and the non-scintillator layer to have a desired size, and it is preferable to apply pressure in a state in which a spacer such as a metal is provided in advance so that the laminate is not compressed exceeding a desired size. The pressure at that time is preferably from 1 MPa to 10 GPa. When the pressure is lower than the lower limit of the above range, there is a possibility that a resin component contained in the laminate can not be deformed to a predetermined size. When the pressure is higher than the upper limit of the above range, a spacer may be deformed, and there is a possibility that the laminate is compressed exceeding a desired size.

By heating the laminate in a pressurized state, bonding can be made more robust.

Depending on the kind of a resin, it is preferable to heat a repeated laminate of a plurality of scintillator layers and non-scintillator layers for about from 05 to 24 hours at a temperature equal to or higher than the glass transition point for a thermoplastic resin and at a temperature equal to or higher than the curing temperature for a thermosetting resin. The heating temperature is preferably from 40° C. to 250° C. in general. When the temperature is lower than the lower limit of the above range, the fusion or curing reaction of the resin may be insufficient, and there is a possibility of poor bonding or returning to the original size when releasing compression. When the temperature is higher than the upper limit of the above range, there is a possibility that the resin deteriorates and the optical characteristics are impaired. There are no particular restrictions on the method of heating the laminate under pressure, and a press equipped with a heating element may be used, the laminate may be oven-heated in a state of being enclosed in a box-shaped jig so as to have a predetermined size, or a heating element may be mounted on a box-shaped jig.

As a state before a repeated laminate of a plurality of scintillator layers and non-scintillator layers is pressurized, it is preferable that voids exist inside the scintillator layer, inside the non-scintillator layer, or in the interface between the scintillator layer and the non-scintillator layer. When pressure is applied in the absence of any voids, a part of a constituent material flows out from an end face of the laminate to cause disorder in the lamination pitch or return to the original size when releasing the pressure. When a void exists, the void becomes a cushion even when pressurized, and the laminate can be adjusted to an arbitrary size in the range until the void becomes zero, that is, the lamination pitch can be adjusted to an arbitrary value. The porosity is calculated from the following formula using a measured volume (area×thickness) of the laminate and the theoretical volume (weight÷density) of the laminate.

(measured volume of laminate−theoretical volume of laminate)÷theoretical volume of laminate×100

When the area of the laminate is constant, the porosity is calculated from the measured thickness of the laminate and the theoretical thickness (weight/density/area) of the laminate according to the following formula.

(measured thickness of laminate−theoretical thickness of laminate)/theoretical thickness of laminate×100

The porosity of the scintillator layer after heating is preferably 30 vol % or less. When the porosity exceeds the above range, the packing ratio of the scintillator decreases and the luminance decreases.

As means for providing voids in the scintillator layer or the non-scintillator layer, for example, bubbles may be contained in the layer in the process of manufacturing the scintillator layer or the non-scintillator layer, or hollow polymer particles may be added. On the other hand, even when irregularities are present on the surface of the scintillator layer or the non-scintillator layer, the same effect can be obtained since a void is formed at the contact interface between the scintillator layer and the non-scintillator layer. As means for providing irregularities on the surfaces of the scintillator layer or the non-scintillator layer, for example, an irregularity-forming treatment such as a blast treatment or an emboss treatment may be applied to the surface of the layer, or irregularities may be formed on the surface by incorporating a filler in the layer. When a scintillator layer is formed by coating a composition containing scintillator particles and an adhesive resin on a polymer film, irregularities are formed on the surface of the scintillator layer, and voids can be formed at the contact interface with the polymer film. The size of the irregularities can be arbitrarily adjusted by controlling the particle size and dispersibility of the filler.

A radiation source emitting radiation such as X-rays is generally a point wave source. When individual scintillator layers and non-scintillator layers are formed completely in parallel, X-rays obliquely enter the peripheral region of a laminated scintillator. As a result, in the peripheral region, so-called vignetting, in which radiation is not sufficiently transmitted, occurs. Vignetting becomes a serious problem as the scintillator becomes larger in area.

This problem can be solved by making, when, in the laminated scintillator panel, the radiation incident side is defined to be a first surface, and the side facing the first surface is defined to be a second surface, the lamination pitch of the scintillator layer and the non-scintillator layer on the second surface larger than the lamination pitch of the scintillator layer and the non-scintillator layer on the first surface to arrange individual scintillator layers and non-scintillator layers in such a way that they are parallel to the radiation. Specifically, this can be realized by bending the laminated scintillator panel or by forming the laminated scintillator panel into an inclined structure without being bent. In the present invention, by making both the first surface and the second surface of the inclined laminated scintillator panel plane, it is possible to make close contact with a photoelectric conversion panel which is rigid and flat in general, which is preferable from a viewpoint improvement of image quality. On the other hand, when the laminated scintillator panel is to be bent, a photoelectric conversion panel needs to follow the laminated scintillator panel, and therefore, a flexible material is preferably used.

Figure 4:
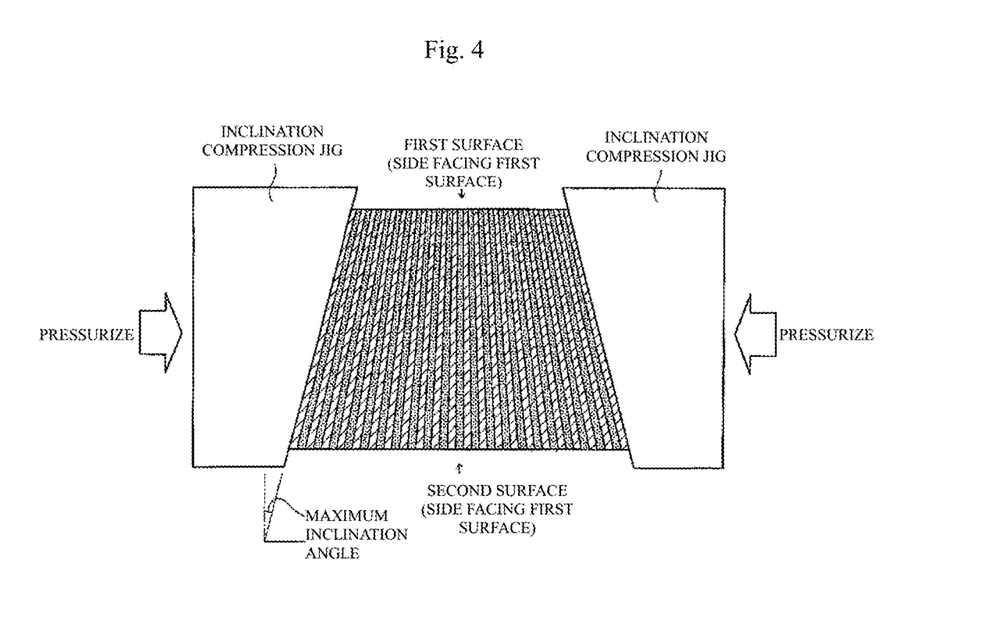
FIG. 4 is a schematic diagram of a laminated scintillator panel with inclination.

In order for the laminated scintillator panel to have an inclined structure, for example, in a step of pressurizing the repeated laminate of the plurality of scintillator layers and non-scintillator layers, the pressurizing direction is made oblique, thereby forming an inclined structure having a trapezoidal cross section as shown in FIG. 4. The inclination angle is the maximum at an end side of the laminated scintillator panel, and it becomes continuously close to parallel toward the center. The maximum inclination angle is determined by the size of the laminated scintillator panel or the distance between the laminated scintillator panel and the radiation source, and is usually from 0 to 10°. As a pressurizing method for forming the inclined structure, for example, a pressurizing jig having a predetermined inclination as shown in FIG. 4 is used. The inclination angle 0° means parallel, and the above range is included in the concept of "substantially parallel" or "parallel" in the specification of the present application.

At the interface between the scintillator layer and the non-scintillator layer of the laminated scintillator panel, for the purpose of improving sharpness, a light-shielding layer for suppressing diffusion of light emitted from the scintillator may be provided. The light-shielding layer is not particularly limited as long as it has a function of suppressing propagation of light emitted from the scintillator, and may have, for example, a light-reflecting function, or may have a light-absorbing function.

In order not to significantly impair the luminance, the light-shielding layer is preferably inserted at a ratio of one layer to a lamination pitch of from five layers to 500 layers, and more preferably is inserted at a ratio of one layer to a lamination pitch of from 10 layers to 100 layers. When the lamination pitch falls below the lower limit of a specified value, the sharpness improves but the luminance greatly decreases, and when the lamination pitch exceeds the upper limit, the effect of improving the sharpness is impaired.

Means for providing the light-shielding layer is not particularly restricted, and dye or pigment, or ink containing metal nanoparticles may be applied, or a metal thin film may be provided by a gas phase method such as vapor deposition or sputtering.

In the present invention, it is preferable that a plurality of scintillator layers and non-scintillator layers are bonded and then a bonding end face is planarized. In particular, scattering of a scintillator light at the bonding end face can be suppressed by planarizing the face on the radiation incidence side, the side opposite thereto, or both sides, thereby improving the sharpness. The planarizing method is not particularly limited, and energy such as ions, plasma, electron beam, or the like may be irradiated in addition to machining such as cutting, grinding, and polishing. In the case of machining, it is preferable to work in a direction parallel to a laminated structure so as not to damage the lamination structure of scintillator layers and non-scintillator layers.

Since the thickness of the laminated scintillator panel in the present invention in the direction of incidence of radiation is as thin as several mm or less, in order to maintain the lamination structure, it is preferable that the surface on the radiation incidence side, the side opposite thereto, or both surfaces are bonded and held on a support.

As the support, a variety of glasses, polymer materials, metals, or the like which can transmit radiation such as X-rays can be used, and examples thereof include: glass sheets such as quartz, borosilicate glass, and chemically tempered glass; ceramic substrates such as sapphire, silicon nitride, and silicon carbide; semiconductor substrates (photoelectric conversion panels) such as silicon, germanium, gallium arsenide, gallium phosphorus, and gallium nitrogen; polymer films (plastic films) such as cellulose acetate films, polyester films, polyethylene terephthalate films, polyamide films, polyimide films, triacetate films, and polycarbonate films; metal sheets such as aluminum sheets, iron sheets, and copper sheets; metal sheets having a coating layer of the metal oxide; carbon fiber reinforced resin (CFRP) sheets; and amorphous carbon sheets. The thickness of the support is preferably from 50 μm to 2,000 μm, and more preferably from 50 to 1,000 μm.

A method of laminating a laminated scintillator panel and a support is not particularly specified, and for example, an adhesive, a double-sided tape, a hot-melt sheet, or the like can be used. After laminating the laminated scintillator panel and the support, the surface opposite to the bonding surface may be planarized.

Between the laminated scintillator panel and the support may be provided a layer that reflects light emitted from the scintillator or a layer that absorbs light emitted from the scintillator depending on an intended use. The luminance is improved by providing a layer that reflects light emitted from the scintillator, and the sharpness is improved by providing a layer that absorbs light emitted from the scintillator. The support itself may have a function of reflecting or absorbing light emitted from the scintillator.

By facing the laminated scintillator panel of the present invention to a photoelectric conversion panel, it is possible to convert light emitted from the scintillator caused by radiation into an electric signal to acquire a digital image. Although the laminated scintillator panel and the photoelectric conversion panel may be faced to each other in a non-contact manner, in order to reduce the optical loss at the interface between the laminated scintillator panel and the photoelectric conversion panel, it is preferable that they are bonded with a transparent material having a refractive index exceeding 1.0 (air). The bonding method of the laminated scintillator panel and the photoelectric conversion panel is not particularly specified, and for example, an adhesive, a double-sided tape, a hot-melt sheet or the like can be used.

The facing laminated scintillator panel and the photoelectric conversion panel may be curved so as to prevent the aforementioned vignetting. In this case, the photoelectric conversion panel is preferably a flexible material.

According to the present invention as described above, a laminated scintillator panel capable of enlarging the area and increasing the thickness with a concept totally different from the use of a silicon wafer can be provided.

According to the present invention, it is possible to provide a laminated scintillator panel by a simple method of going through a process of bonding a scintillator layer and a non-scintillator layer, it is also possible to enlarge the area of the panel or to increase the thickness of the panel, which has been conventionally difficult, and it is also possible to arbitrarily adjust the lamination pitch. Therefore, the laminated scintillator panel according to the present invention can be used as a scintillator for a Talbot system. By changing the scintillator particles of the present invention to high-X-ray-absorbing particles such as heavy metals, the present invention can also be applied to manufacturing methods of a variety of lattices for Talbot such as G0 lattice, G1 lattice, and G2 lattice.

EXAMPLE

Hereinafter, the present invention will be described by way of Examples, but is not limited to the Examples in any way.

Examples and Comparative Examples were reproduced by simulation by ray tracing.

First, a substrate, a wavelength conversion layer, a sensor protection layer, and a sensor are arranged in this order from the top, and the wavelength conversion layer is disposed so that a scintillator layer containing a phosphor and a resin and a non-scintillator layer are formed in a slit shape and uniformly upright with respect to the substrate and the sensor.

The length of the short side of each of the scintillator layer and the non-scintillator layer was 2.6 µm as viewed from the substrate side or the sensor side. On the surface of the substrate which is in contact with the wavelength conversion layer, a light reflecting portion having the same reflectance as that of Al is provided over the entire region.

The volume ratio of the phosphor and the resin constituting the scintillator layer is 5050. Assuming Gd2O2S (GOS) particles, the phosphor had a particle size of 2.6 µm and a refractive index of 2.3, and for the resin, the refractive index was 1.52. In the scintillator layer, it is assumed that the phosphor particles are uniformly dispersed in the resin, and the diffusion of light in the scintillator layer was set as the Mie scattering phenomenon.

Assuming a resin such as acrylic, the sensor protection layer had a refractive index of 1.50 and a thickness of 5 µm. At the interface of all the members, Fresnel reflection due to the difference in refractive index was assumed.

In order to satisfy conditions necessary for the present invention, in the above configuration, the non-scintillator layer was set as a resinous film, a functional layer was provided on the surface of the non-scintillator layer at a desired interval "D" (µm), and the reflectance at a wavelength (550 nm) at which the intensity of scintillator light was maximum was defined as "R" (%). The film thickness of the wavelength conversion layer of the above basic model was set to "T" (µm), and in the simulation, the effect when changing the combination of T, D and R was calculated.

The reflecting layer (functional layer) provided in the non-scintillator layer is formed by sputtering film formation of a metal film such as Al on the PET film surface. The reflectance is adjusted by changing the metal species or by changing the thickness of the sputtered film. For those having extremely low reflectance, a light absorbing film such as a black PET film is used.

For the functional layer whose refractive index was lower than that of the scintillator layer, the effect was calculated by setting the non-scintillator layer as an air layer (refractive index 1.00) at a desired interval "D" (µm).

A model region to be simulated was a square of 20 mm square. X-rays that were irradiated at a tube voltage of 71 kV as incident X-rays and transmitted through a metal filter made of Al having a thickness of 21 mm were assumed, and it was assumed that the X-rays having the energy spectrum were irradiated at the center position of the model region with a spot of 0.01 µm in diameter. Further, the intensity distribution of scintillation light emitted by absorption of incident X-rays was calculated by deriving an X-ray energy absorption amount corresponding to the penetration depth of X-rays in the direction perpendicular to the substrate surface side of the scintillator layer from the volume ratio of a phosphor and the mass energy absorption coefficient and multiplying that value by the luminous efficiency of the phosphor.

As for the sensor which was the light receiving surface, it was assumed that the interface between the sensor protection layer and the sensor surface did not cause optical geometric diffraction or optical scattering, and the light receiving surface immediately absorbed the light that reached the interface.

Based on the above model, simulation was carried out using Zemax OpticStudio which is ray tracing software of Zemax Corporation. 10,000 light rays corresponding to scintillation light were generated, and from the point spread function (PSF) which was the light intensity distribution absorbed by the sensor, a modulation transfer function (MTF) as an index of spatial resolution and luminance were obtained.

In a method of actually fabricating the structure of the above model, a paste obtained by mixing a phosphor and a resin was applied to form a film on a PET film, and such sheets were laminated and thermocompression-bonded to form a slit-like wavelength conversion layer.

Evaluation results are shown in the table below.

In cases in which the MTF was improved, it was derived from the result of an examination that the image quality was judged to be favorable when the luminance was 70% or more of a reference. As judgment criteria of the evaluation, "○" was assigned to the case where the luminance was 70% or more of the reference and the MTF was 105% or more of the reference, and "x" was assigned for those which did not satisfy them. As the reference, a slit-like scintillator without a functional layer was used.

TABLE 1

|  | Film thickness (T) | Functional layer interval (D) | Interval/Film thickness (D/T) | Functional layer Material | Functional layer Reflectance (R) | Luminance | MTF | Evaluation |
|---|---|---|---|---|---|---|---|---|
| Reference | 200 | None | None | None |  | 100% | 100% | — |
| Example 1 | 200 | 100 | ½ | Al | 90% | 97% | 230% | ○ |
| Example 2 | 200 | 100 | ½ | Al | 70% | 90% | 235% | ○ |
| Example 3 | 200 | 100 | ½ | Al | 40% | 81% | 238% | ○ |

TABLE 1-continued

| | Film thickness (T) | Functional layer interval (D) | Interval/Film thickness (D/T) | Functional layer Material | Reflectance (R) | Luminance | MTF | Evaluation |
|---|---|---|---|---|---|---|---|---|
| Example 4 | 200 | 100 | ½ | Black PET | 0% | 70% | 245% | ○ |
| Example 5 | 200 | 66 | ⅓ | Al | 90% | 92% | 235% | ○ |
| Example 6 | 200 | 66 | ⅓ | Al | 70% | 80% | 237% | ○ |
| Example 7 | 200 | 66 | ⅓ | Al | 40% | 72% | 240% | ○ |
| Comparative Example 1 | 200 | 66 | ⅓ | Black PET | 0% | 52% | 248% | x |
| Example 8 | 200 | 50 | ¼ | Al | 90% | 87% | 236% | ○ |
| Example 9 | 200 | 50 | ¼ | Al | 70% | 70% | 240% | ○ |
| Comparative Example 2 | 200 | 50 | ¼ | Al | 40% | 55% | 243% | x |
| Comparative Example 3 | 200 | 50 | ¼ | Black PET | 0% | 47% | 249% | x |
| Example 10 | 100 | 50 | ½ | Al | 90% | 94% | 185% | ○ |
| Example 11 | 100 | 50 | ½ | Al | 40% | 85% | 186% | ○ |
| Example 12 | 100 | 50 | ½ | Black PET | 0% | 70% | 187% | ○ |
| Example 13 | 100 | 33 | ⅓ | Al | 90% | 87% | 193% | ○ |
| Example 14 | 100 | 33 | ⅓ | Al | 40% | 73% | 193% | ○ |
| Comparative Example 4 | 100 | 33 | ⅓ | Black PET | 0% | 50% | 194% | x |
| Example 15 | 100 | 25 | ¼ | Al | 90% | 82% | 198% | ○ |
| Comparative Example 5 | 100 | 25 | ¼ | Al | 40% | 53% | 198% | x |
| Comparative Example 6 | 100 | 25 | ¼ | Black PET | 0% | 45% | 198% | x |
| Example 16 | 200 | 400 | 2 | Al | 90% | 98% | 130% | ○ |
| Example 17 | 200 | 600 | 3 | Al | 90% | 99% | 105% | ○ |
| Comparative Example 7 | 200 | 800 | 4 | Al | 90% | 100% | 100% | x |
| Example 18 | 200 | 400 | 2 | Black PET | 0% | 80% | 150% | ○ |
| Example 19 | 200 | 600 | 3 | Black PET | 0% | 91% | 115% | ○ |
| Comparative Example 8 | 200 | 800 | 4 | Black PET | 0% | 98% | 100% | x |
| Example 20 | 200 | 50 | ¼ | Air | | 80% | 235% | ○ |
| Example 21 | 200 | 100 | ½ | Air | | 87% | 230% | ○ |
| Example 22 | 200 | 200 | 1 | Air | | 92% | 200% | ○ |
| Example 23 | 200 | 400 | 2 | Air | | 95% | 137% | ○ |
| Example 24 | 200 | 600 | 3 | Air | | 98% | 106% | ○ |
| Comparative Example 9 | 200 | 800 | 4 | Air | | 100% | 100% | x |

Examples 1, 2, 5, 6, 8, 9, 1013, and 15

When R of the functional layer was 70% or more, it can be seen that the luminance and MTF satisfy the criteria when D/T was ¼ or more.

Examples 3, 7, 11, and 14 and Comparative Examples 2 and 5

When R was 40% or more and less than 70%, it can be seen that the luminance and MTF satisfy the criteria when D/T was ⅓ or more, and the criteria were not satisfied when D/T was less than ⅓.

Examples 4 and 12 and Comparative Examples 1, 3, 4, and 6

When R was less than 40%, it can be seen that the luminance and MTF satisfy the criteria when D/T was ½ or more, and the criteria were not satisfied when D/T was less than ½.

Examples 16, 17, 18, and 19 and Comparative Examples 7 and 8

It can be seen that an effect of improving MTF can be obtained when D/T was 3 or less, and an effect of improving MTF can not be obtained when D/T was larger than 3.

Example 2021, 22, 23, 24, Comparative Example 9

In cases in which the refractive index of the functional layer is lower than that of the scintillator layer, it can be seen that the luminance decrease is small even when the interval between the functional layers is narrow. At such a level, it can be seen that an effect of improving the MTF can be obtained when the D/T was 3 or less, and the MTF improving effect can not be obtained when the D/T was larger than 3.

Although Embodiments have been described above, the present invention is not limited to these Embodiments. It goes without saying that changes in purpose, state, use, function, and other specifications are possible as appropriate, and may be implemented by other embodiments.

According to the present invention, a laminated scintillator panel different from the conventional concept is provided. In other words, by disposing functional layers such as a reflecting layer at specific intervals, an effect of improving image quality is high, and luminance and resolution are compatible. The area of the scintillator panel can be enlarged and the thickness thereof can be increased, and the lattice pitch can be arbitrarily adjusted. The laminated scintillator panel according to the present invention can be used as a scintillator having a function of a grating for a Talbot-Lau interferometer. Since a specific functional layer is provided, the MTF can be greatly improved without impairing the luminance of a slit scintillator, and therefore, a laminated scintillator panel having both improved luminance and improved resolution is provided.

The laminated scintillator of the present invention has high luminance and is suitable for enlarging the area and increasing the thickness of the film. For this reason, high-voltage photographing is also possible, and it is also possible to photograph thick subjects such as a thoracoabdominal part, a thigh part, an elbow joint, a knee joint, and a hip joint.

Conventionally, in diagnostic imaging of cartilage, MRI is the mainstream, and there have been disadvantages of high photographing cost and long photographing time because of using large-scale equipment. On the other hand, according to the present invention, soft tissue such as cartilage, muscle tendon, ligament and visceral tissue can be photographed with a faster X-ray image at lower cost. Therefore, the present invention can be widely applied to orthopedic diseases such as rheumatoid arthritis and osteoarthritis of knee and image diagnosis of soft tissues including breast cancer.

Although embodiments of the present invention have been described and illustrated in detail, it is clearly understood that the same is by way of illustration and example only and not limitation, the scope of the present invention should be interpreted by terms of the appended claims.

What is claimed is:

1. A laminated scintillator panel having a structure in which structural units containing at least one scintillator layer having a function of emitting light when receiving X-rays and a non-scintillator layer are repeatedly laminated in a parallel direction perpendicular to incidence of radiation, wherein at least one functional layer having optical characteristics different from those of the scintillator layer and the non-scintillator layer is contained in the array structure,
    wherein the distance between the functional layers is not more than three times the distance between a radiation incident surface and a radiation exit surface of the laminated scintillator panel,
    a reflectance of light at a wavelength at which the intensity of the scintillator light of the functional layer is maximum is 70% or more, and
    a distance between the functional layers is larger than ¼ times the distance between a radiation incidence surface and a radiation exit surface of the laminated scintillator panel.

2. A laminated scintillator panel having a structure in which structural units containing at least one scintillator layer having a function of emitting light when receiving X-rays and a non-scintillator layer are repeatedly laminated in a parallel direction perpendicular to incidence of radiation, wherein at least one functional layer having optical characteristics different from those of the scintillator layer and the non-scintillator layer is contained in the array structure,
    wherein the distance between the functional layers is not more than three times the distance between a radiation incident surface and a radiation exit surface of the laminated scintillator panel,
    a reflectance of light at a wavelength at which the intensity of scintillator light of the functional layer is maximum is 40% or more and less than 70%, and
    a distance between the functional layers is larger than ⅓ times the distance between a radiation incident surface and a radiation exit surface of the laminated scintillator panel.

3. A laminated scintillator panel having a structure in which structural units containing at least one scintillator layer having a function of emitting light when receiving X-rays and a non-scintillator layer are repeatedly laminated in a parallel direction perpendicular to incidence of radiation, wherein at least one functional layer having optical characteristics different from those of the scintillator layer and the non-scintillator layer is contained in the array structure,
    wherein the distance between the functional layers is not more than three times the distance between a radiation incident surface and a radiation exit surface of the laminated scintillator panel,
    a reflectance of light at a wavelength at which the intensity of scintillator light of the functional layer is maximum is less than 40%, and
    a distance between the functional layers is larger than half the distance between a radiation incident surface and a radiation exit surface of the laminated scintillator panel.

4. The laminated scintillator panel according to claim 1, wherein
    the structure including the functional layer in the repeating array of the scintillator layer and the non-scintillator layer is formed by laminating.

5. The laminated scintillator panel according to claim 2, wherein
    the structure including the functional layer in the repeating array of the scintillator layer and the non-scintillator layer is formed by laminating.

6. The laminated scintillator panel according to claim 3, wherein
    the structure including the functional layer in the repeating array of the scintillator layer and the non-scintillator layer is formed by laminating.

7. The laminated scintillator panel according to claim 1, wherein
    the refractive index of the functional layer is smaller than the refractive index of the main component of the scintillator layer, and light is totally reflected when light is incident from the scintillator layer to the functional layer.

8. The laminated scintillator panel according to claim 2, wherein the refractive index of the functional layer is smaller than the refractive index of the main component of the scintillator layer, and light is totally reflected when light is incident from the scintillator layer to the functional layer.

9. The laminated scintillator panel according to claim 3, wherein the refractive index of the functional layer is smaller than the refractive index of the main component of the scintillator layer, and light is totally reflected when light is incident from the scintillator layer to the functional layer.

* * * * *